US005548088A

United States Patent [19]

Gray et al.

[11] Patent Number: 5,548,088

[45] Date of Patent: Aug. 20, 1996

[54] ELECTRICAL CONDUCTOR TERMINATING ARRANGEMENTS

[75] Inventors: Ian J. Gray; Melvin D. White, both of Winchester, Great Britain

[73] Assignee: ITT Industries, Limited, Basingstoke, United Kingdom

[21] Appl. No.: 290,713

[22] PCT Filed: Jan. 22, 1993

[86] PCT No.: PCT/GB93/00143

§ 371 Date: Aug. 12, 1994

§ 102(e) Date: Aug. 12, 1994

[87] PCT Pub. No.: WO93/16507

PCT Pub. Date: Aug. 19, 1993

[30] Foreign Application Priority Data

| | | | |
|---|---|---|---|
| Feb. 14, 1992 | [GB] | United Kingdom | 9203234 |
| May 14, 1992 | [GB] | United Kingdom | 9210375 |
| Nov. 13, 1992 | [GB] | United Kingdom | 9223825 |

[51] Int. Cl.$^6$ .................... H02G 15/02

[52] U.S. Cl. .................... 174/74 R; 174/75 R; 174/75 C; 439/578; 439/585

[58] Field of Search .................... 174/74 A, 75 C, 174/75 R, 74 R; 439/394, 578, 411, 584, 585

[56] References Cited

U.S. PATENT DOCUMENTS

| | | | |
|---|---|---|---|
| 3,761,870 | 9/1973 | Drezin et al. | 439/584 |
| 3,846,738 | 11/1974 | Nepovim | 439/584 |
| 3,847,463 | 11/1974 | Hayward et al. | 439/578 |
| 3,854,789 | 12/1974 | Kaplan | 439/584 |
| 3,977,752 | 8/1976 | Freitag | 439/394 |
| 4,491,685 | 1/1985 | Drew et al. | 174/75 C |
| 4,897,041 | 1/1990 | Heiney . | |
| 4,897,045 | 1/1990 | Dyck | 439/578 |
| 4,902,246 | 2/1990 | Samchisen . | |
| 5,340,332 | 8/1994 | Nakajima et al. | 439/584 |

*Primary Examiner*—Morris H. Nimmo
*Attorney, Agent, or Firm*—Thomas L. Peterson

[57] ABSTRACT

An electrical conductor terminating arrangement such as an electrical connector includes a contact-making element which makes good contact with an electrical conductor in response to axial pressure displacement over the contact-making element of a displaceable element to exert a radial force on the contact-making element and to co-operate therewith for providing ongoing pressure engagement between the contact-making element and the electrical conductor without the need for the continuance of axial pressure on the displaceable element after a predetermined axial displacement of the displaceable element.

18 Claims, 3 Drawing Sheets

ELECTRICAL CONDUCTOR TERMINATING ARRANGEMENTS

This invention relates to electrical conductor terminating arrangements which are especially, but not exclusively, applicable to the termination of electrical conductors in electrical connectors of the coaxial type.

The invention is especially directed to an improved conductor terminating arrangement in a coaxial connector of the kind facilitating the ready and effective connection of the usual central conductor of an incoming coaxial cable to contact means (e.g. pin contact) of the connector without the need for crimping and/or other tools.

A coaxial connector is known from U.S. Pat. No. 3,761,870 in which the central conductor is secured to a clamping member by the action of an axial force which is exerted upon assembly of the connector by means of a nut which is threadably connected to the connector body,. The nut causes a clamping member to be axially displaced which clamping member has a bevelled end surface which cooperates with the periphery of a mushroom shaped resilient dielectric element which has a through channel that fits over the clamping member. The axial force causes radial inward depression on the clamping member to effect clamping of the conductor. When the axial pressure is removed, for example upon the disassembly of the connector, the radially inward depression is terminated and the electrical and mechanical integrity between the clamping member and the conductor is no longer maintained and they are easily separable.

Another coaxial connector is known from U.S. Pat. No. 3,847,463 in which the central conductor is secured within a collet having a bevelled end. This is effected by cooperation with a collet closer which has a bevelled recess, conforming with the bevel of the collet, the two bevelled surfaces cooperating upon relative axial displacement into engagement to clamp the conductor. The relative axial displacement is effected during assembly of the connector by screwing action between a cable nut and an outer conductor. The clamping action is dependent upon the axial force exerted by the relative axial displacement and removal of that axial force by unscrewing of the cable nut permits the separation of the collet and collet closer thereby failing to maintain electrical and mechanical integrity between the collet and the conductor.

The present invention seeks to provide a connector which electrical and mechanical integrity is maintained when an axial clamping force is removed so that the connector can be disassembled without that integrity being sacrificed.

According to the present invention there is provided an electrical conductor terminating arrangement, comprising an electrically conductive contact-making means for receiving a conductor, an axially displaceable means which when displaced over the contact making means in a direction axially of the contact making means exerts a radial force on the contact making means to secure the conductor by pressure engagement, characterised in that the contact, making means and axially displaceable means are adapted to ensure retentive mutual engagement therebetween when the axially displaceable means is displaced axially over the contact making means to provide ongoing radial pressure engagement between the contact making means and the electrical conductor in order to maintain electrical and mechanical integrity therebetween without the need for continuance of axial pressure on the axially displaceable means.

By ensuring that the axially displaceable means and contact making means are mutually retentively secured after axial displacement then the electrical and mechanical integrity of the connection of the contact means to the conductor is ensured even when the connector is disassembled.

In carrying out the present invention the displaceable means may comprise a resilient or non-resilient sleeve member which when displaced axially exerts an inward radial force on the contact-making means located within the sleeve member and which co-operates with the contact-making means positioned over the electrical conductor to provide the aforesaid ongoing pressure engagement with the conductor. A resilient sleeve member may be provided by a split metal ring or a continuous ring of resilient plastics material whereas a continuous metal ring may comprise a non-resilient sleeve member.

The contact-making means of the conductor terminating arrangement may comprise a compressible clamping element adapted to fit over the electrical conductor.

The compressible clamping element may comprise a split tubular metal part into one end of which the conductor extends and which is adapted to be radially compressed by the contact-making means to make good electrical contact with the conductor. The split tubular metal part may be formed integrally with contact means (e.g. pin contact) of the terminating arrangement provided at the end thereof remote from the end at which the conductor enters the tubular compressible clamping element.

To positively ensure good electrical contact between the compressible clamping element and the electrical conductor, the actual conductor clamping region of the element may be screw-threaded or otherwise configured to bite into the outer surface of the electrical conductor as clamping takes place.

The split tubular clamping element may, for example, be provided with radial slots which have a width less than the diameter of the conductor and which present at the periphery of a central passage in the element for slidingly receiving the conductor, sharp edges to bite into the outer surface of he conductor to make good electrical contact therewith when the clamping element is compressed. Four such radial slots may be provided to afford a passageway of cruciform configuration but other multi-slot constructions are also contemplated.

To accommodate conductors of different sizes the nubular clamping element may be stepped on its inner surface.

The split tubular clamping element may be of relatively large diameter and connected with the contact means of the terminating arrangement by a split frusto-conical section which facilitates smooth and easy transitional displacement of an associated resilient sleeve member from the conical surface thereof to the outer periphery of the clamping element in order to compress the tubular element radially inwards as the resilient sleeve member is displaced axially over the split tubular element.

In accordance with one especially contemplated application of the present invention, a conductor terminating arrangement of the foregoing construction as broadly conceived is provided as part of a coaxial connector comprising a tubular body structure having an axially extending bore therein for receiving an incoming coaxial cable and for accommodating the electrically conductive contact-making means of the terminating arrangement located adjacent a part of the cable within the tubular body structure and electrically coupled with connector contact means (e.g. pin contact), the displaceable means of the arrangement, in response to the predetermined axial displacement thereof exerting a radial force on the contact-making means with which it co-operates to provide ongoing pressure engagement between the contact-making means and the central conductor of the coaxial cable to ensure good electrical contact therebetween without the need for the continuance of any axially applied force to the displaceable means.

The resilient or non-resilient sleeve member may form part of the axially displaceable means which also comprises a tubular insulating member at least partly accommodated within the axially extending bore of the tubular body structure of the connector at the contact means end of the connector, the sleeve member being engaged by or being attached to or formed integrally with the tubular insulating member.

Displacement of the tubular insulating member may be arrested by the abutment of an end portion of the member with shoulder means of a cup-shaped insulating stop member located within the bore of the tubular member and having a tapered opening therethrough for the passage of the central conductor of the coaxial cable.

The tubular insulating member received by the axially extending bore of the tubular body structure of the connector may, in accordance with our co-pending British patent application No. 9223824.5, be adapted to make a first snap engagement with another connector part whereby the connector conductor clamping or contacting-making component part is held in a pre-conductor clamping or connecting state. The tubular insulating member may also be adapted to be moved further to a position at which it makes a second snap engagement with a connector part when the clamping or contact-making part makes good electrical contact with the central conductor.

The provision of such a pre-conductor clamping and pre-conductor contact assembled state of the connector in which connector component parts are contained in situ enables the connector to be handled/transported and/or delivered without the risk of parts becoming detached or lost.

For the purpose of gripping an incoming coaxial cable at the end of the connector where the coaxial cable enters, a suitable strain-relief arrangement may be provided.

The strain relief facility may be provided by sliding the end of the connector remote from the contact between the metal braiding of the cable and the underlying cable insulation and then crimping a metal ferrule down on to the braiding.

By way of example various embodiments of the present invention will now be described with reference to the accompanying drawings in which.

Figure 1:
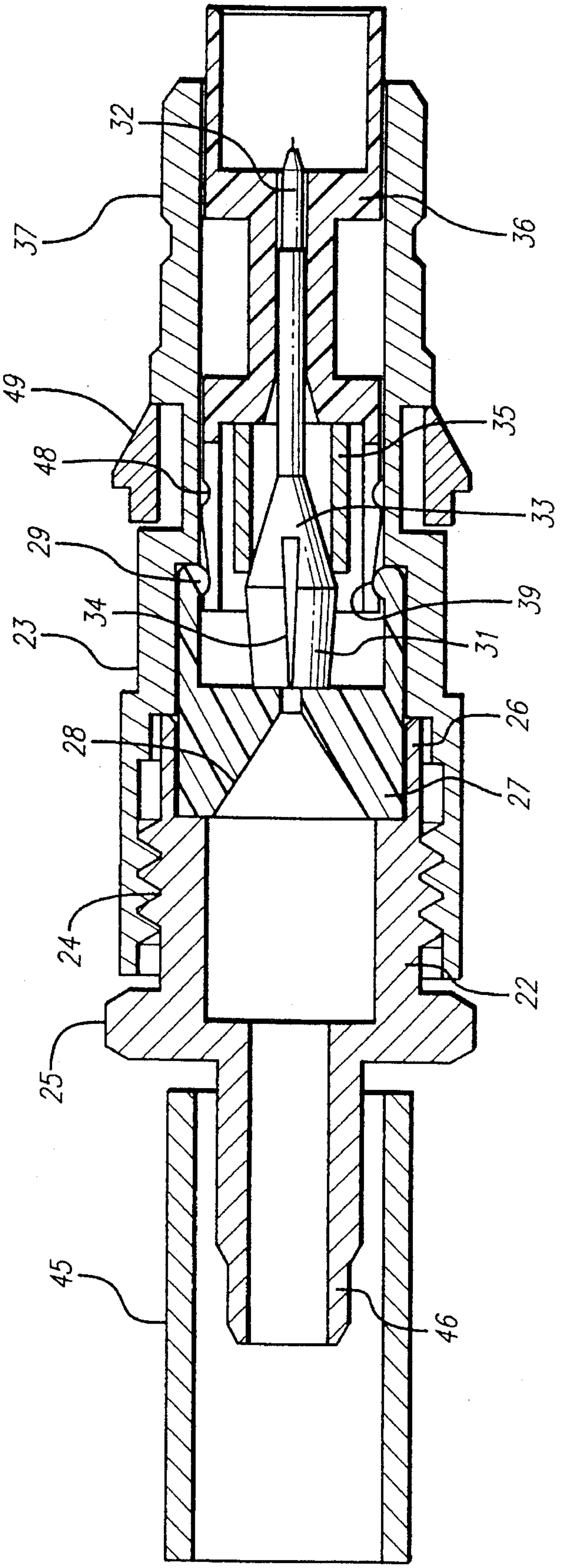
FIG. 1 shows a longitudinal cross-sectional view of a coaxial cable connector comprising a conductor terminating arrangement in accordance with the present invention.
Figures 2, 2A:
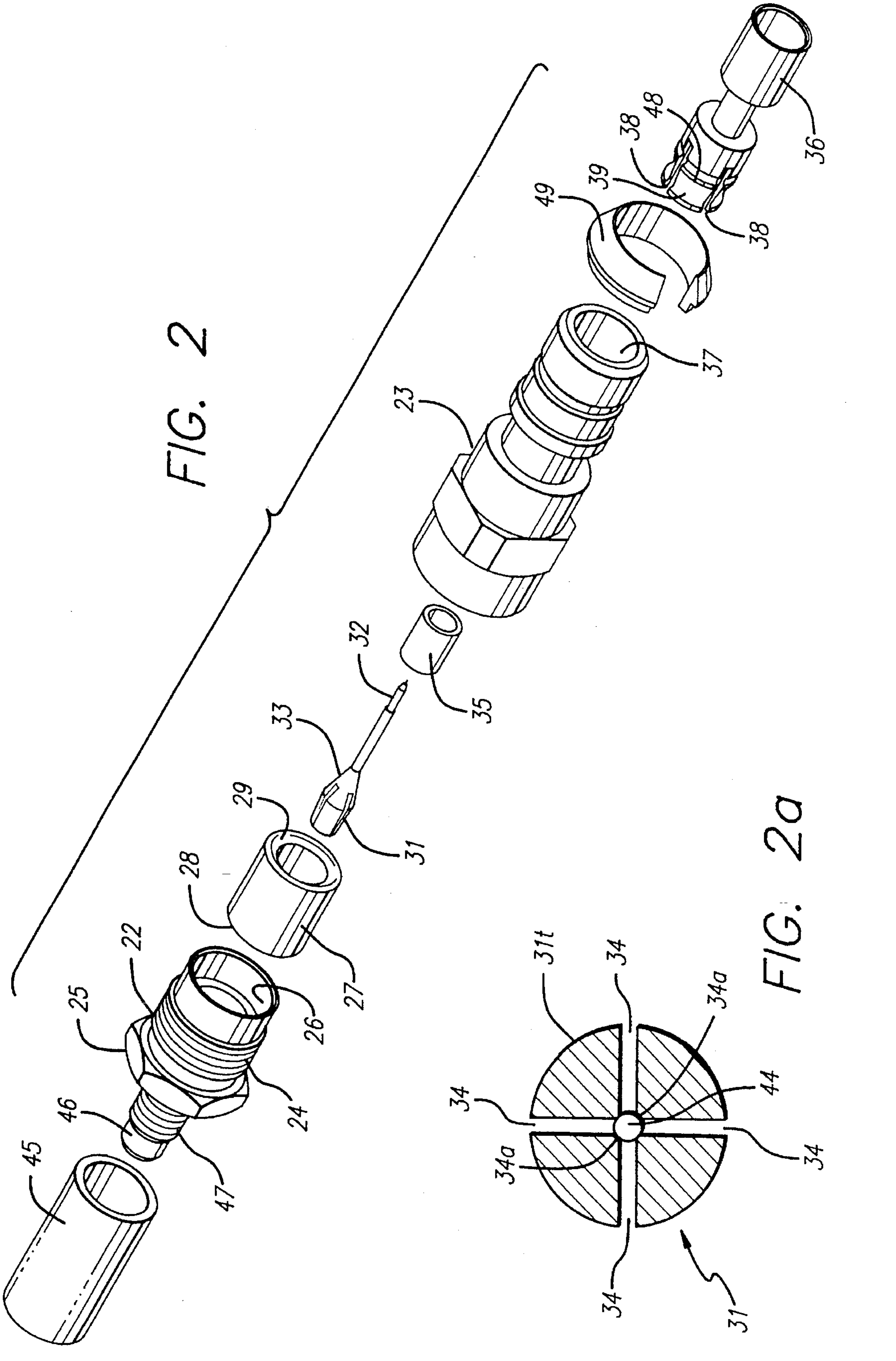
FIG. 2 shows an exploded view of the coaxial cable connector of FIG. 1 with small modifications.
Figure 3A:
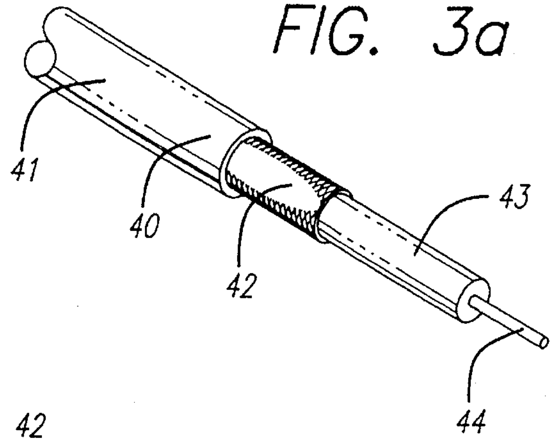
Figure 3B:
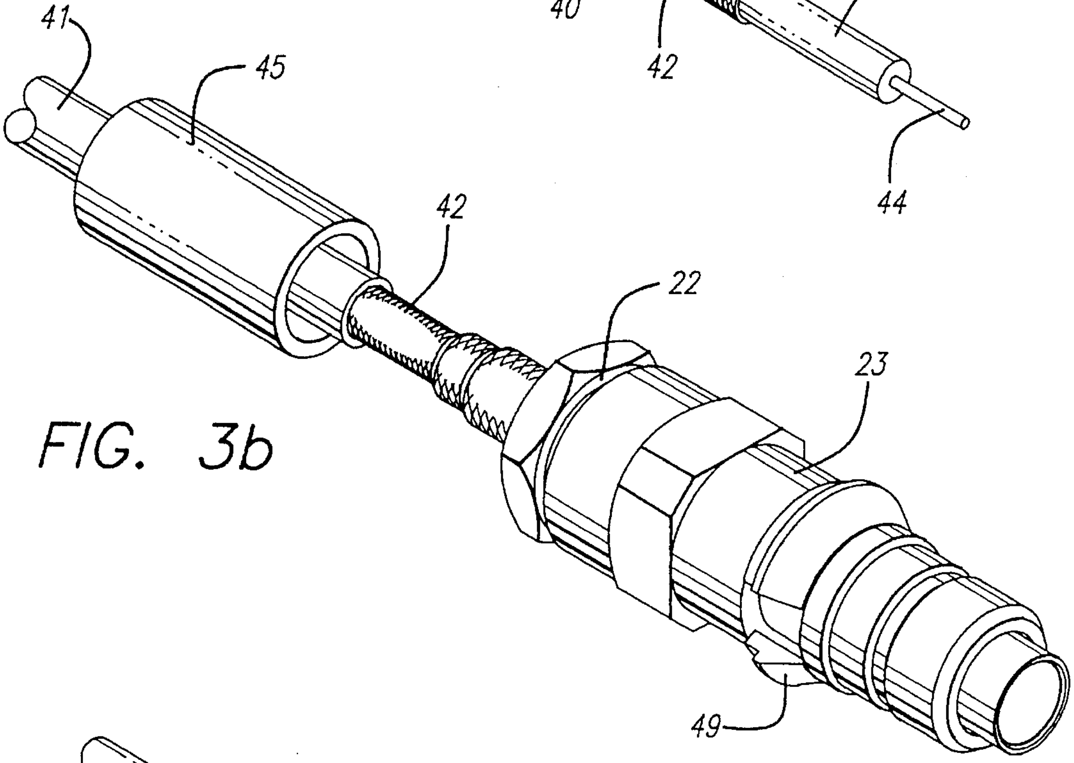
Figure 3C:
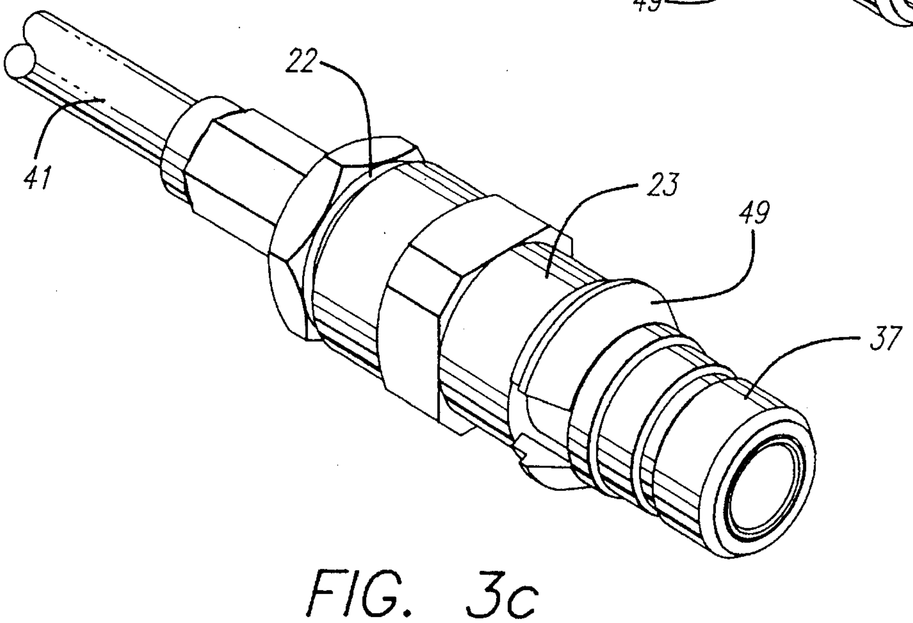

FIG. 2*a* shows an enlarge detail of FIG. 2; and,

FIGS. 3*a*, 3*b* and 3*c* show different steps in the connection of an incoming cable to the connector of FIG. 1.

Referring now to FIGS. 1 and 2 of the drawings, the embodiment depicted therein constitutes a preferred construction which provides inter alia a pre-conductor clamping assembled state of the connector.

The tubular body structure of the coaxial connector comprises two generally cylindrical metal parts 22 and 23, the body part 22 having an externally-threaded portion 24 which, as facilitated by the integral nu head 25, can be screwed into an internally-threaded portion of the body part 23. The body part 22 includes a cylindrical cavity 26 which slidingly receives a hollow cylindrical latching member 27 of electrically insulating material. The end of the latching member 27 which engages the base of the cavity 26 is provided with a conical recess 28 against the surface of which the end of the dielectric layer of an incoming coaxial cable to the connector will abut, as will later be apparent. The right-hand end of the latching member 27 is provided with a radially inwardly extending lip or projection 29.

The latching member 27 is adapted to receive the end of a split radially compressible metal clamping collet 31 of the conductor terminating arrangement which, in the present embodiment is formed integrally with a contact 32 (e.g. pin contact) of the connector connected to the collet 31 by a split conical section 33. The internal periphery of the clamping collet may be threaded or provided with serrations or surface irregularities or otherwise configured in order to bite into the outer surface of the single or stranded central conductor of the coaxial cable during the conductor clamping operation in the present embodiment the metal clamping collet 31 of the terminating arrangement, as can best be seen from FIG. 2*a* of the drawings, is split axially by means of four radial slots 34 which define a cruciform passageway extending axially through the collet and providing four axially extending sharp corners or edges 34*a* towards the centre of the passageway where clamping of a central conductor 44 of the coaxial cable takes place. The width of the radial slots 34 will be less than the diameter of the central conductor but the central passage or region of the cruciform passageway will be sufficiently large to slidingly receive the central conductor 44 before radial compression of the collet 31 takes place to effect clamping of the conductor and termination of the latter in the connector. During such conductor clamping the axially extending sharp edges 34*a* of times it of the collet 31 will bite into the conductor 44 in order to ensure good electrical contact therewith. Thus, the collet 31 serves as a contact making means for contacting the conductor 44 as a result of the radial force on the contact making means 31 by axial displacement of the clamping ring, or clamping means 35. As will readily be apparent, other multi-slot collet constructions could alternatively be provided to achieve a similar result. A six slot collet construction is also especially contemplated.

A resilient split metal sleeve member, or clamping ring 35 forming part of axially displaceable means and corresponding to the clamping ring 35 in FIG. 1 is provided for co-operating with the collet 31 to effect radial compression thereof. To achieve such compression, a tubular axially-displaceable member 36 of insulating material also forming part of the displaceable means is provided. The displaceable member 36 is slidably received in a through bore 37 of the body part 23. When the two body parts 22 and 23 are secured together with the collet 31 the co-operating clamping ring 35 is located within the internal cylindrical cavity of the body structure, and the member 36 can readily be displaced axially. Axial displacement is achieved simply by exerting finger pressure on the right-hand end of the clamping member, as viewed in the drawing, so that the radially flexible slotted end of the member 36 defined by slots 38 first makes snap engagement with the tubular latching member 27. Such first engagement is by the engagement or the internal lip or projection 29 on the member 27 with an external circumferential groove 39 in the slotted end of the displaceable member 36. It will be appreciated that the latching member 27 could be possibly be slotted, in which case the slots 38 in the member 36 could be dispensed with. As will readily be appreciated from FIG. 1 of the drawings which shows the connector in an assembled state prior to clamping of the central cable conductor, component parts of the connector are securely held in situ by the initial latching arrangement provided between the members 27 and 36 with the lip 29 of member 27 engaging groove 39 in the member 36. Such an arrangement importantly enables connectors to be handled and/or transported/delivered in readiness for cable connection and conductor clamping without the risk of connector parts becoming detached or lost.

In order to connect the connector to an incoming coaxial cable, as shown at 40 in FIG. 3*a* of the drawings, the usual outer insulation sleeve 41 will be cut back, as shown, to expose a suitable length of an underlying metal braided screen 42. The metal braid will then be stripped back, as shown, over a requisite length to leave a length of extruded dielectric insulation 43 exposed. This dielectric will then be cut back to leave a length of bared central conductor 44. The cable end will then be inserted through a metal crimping ferrule, shown at 45 in FIGS. 2 and 3*b*, and then into the cable receiving end of the body part 22 which is already screwed to the body part 23 in the pre-conductor clamping assembled state of the connector shown in FIG. 1. The body part 22 has a tubular extension 46 which may have circumferential ridges 47 so that as the cable moves into the-interior of the connector the ridged extension 46 will be urged between the dielectric layer 43 and the metal braiding sleeve 42 of the cable, as shown in FIG. 3*b*, whilst the bared end 44 of the central conductor will move into and along the central passage of the clamping collet 31 as indicated in FIG. 2*a* of the drawings, until the forward end of the exposed dielectric material 43 abuts against he conical surface of the recess 28 provided in the latching member 27.

To effect clamping of the collet 31 to the central conductor 44 of the incoming cable 40 and thereby effect termination of the conductor 44 in the connector, the axially displaceable member 36 is simply pressed from its initial pre-clamping latched position further into the bore 37, as a result of which the clamping ring 35 of the terminating arrangement will be forced by the displacement member 36 over the cylindrical surface of the split collet 31 which is accordingly compressed radially inwards so that the inner axially extending sharp edges 34*a*, as shown in FIG. 2*a*, bite into the outer surface of the single or stranded central conductor in order to make good electrical contact therewith. When sufficient clamping force has been exerted on the collet 31 by movement of the clamping ring 35, the displaceable member 36 makes a second and final snap engagement with the latching member 27 by the engagement of a second circumferential groove 48 in the member 36 with the inturned lip or projection 29 on the latching member 27. In this position of the displaceable member 36 the components of the connector are in the conductor clamped assembled state with the resilient split clamping ring 35 co-operating with the split collet 31 to provide ongoing pressure engagement between the collet and the central conductor. No continuing axial pressure needs to be applied to the displaceable member. In this clamped conductor state of the connector the cable may be pulled to carry out a tensile test for ensuring that effective clamping of the central conductor has been achieved.

Although in the embodiment described with reference to FIGS. 1 to 3 the clamping ring 35 comprises a resilient split metal ring which co-operates with the clamping element 31 to provide ongoing pressure engagement with the central conductor 44, it will be appreciated that the clamping ring 35 could be replaced by a non-resilient (continuous) sleeve member which co-operates with resilient contact-making means over which such non-resilent sleeve member fits to provide the ongoing pressure engagement between the contact-making means and the central conductor of the co-axial cable.

It is contemplated that the members 27 and 36 could be composed of a transparent insulating material which would enable a conductor clamp connection to be viewed after unscrewing the two body parts.

In order to complete the strain relief connection between the incoming cable 40 and the connector, the metal ferrule 45 may be positioned over the metal braiding overlying the tubular ridged extension 46, as can be seen in FIG. 3*b* of the drawings, and then crimped down on to the braiding, as shown in FIG. 3*c*.

To enable the connector to be panel mounted, a radially collapsible ring 49 may be fitted in a groove of the body part 23. The configuration of the ring allows the contact end of the connector to be inserted into a panel aperture after which the ring restores to hold the connector in position.

The tubular insulating member 36 and the bore 37 of the tubular body structure may be provided with grooves and/or projections which cooperate to lock the tubular insulating member in position within the bore of the body structure as clamping takes place.

We claim:

1. An electrical conductor terminating arrangement, comprising an electrically conductive contact-making means (31) for receiving and making electrical contact with an electrical conductor, an axially displaceable clamping means (35) which when displaced over the contact making means in a direction axially of the contact making means (31) exerts a radial force on the contact making means to secure a conductor when installed by pressure engagement, characterized in that the contact making means (31) and axially displaceable means (35) are adapted to ensure retentive mutual engagement therebetween when the axially displaceable means is displaced axially over the contact making means to provide ongoing radial pressure engagement between the contact making means (31) and the electrical conductor (44) when installed in order to maintain electrical and mechanical integrity therebetween without the need for continuance of axial pressure on the axially displaceable means (35).

2. An electrical conductor terminating arrangement as claimed in claim 1, characterized in that the axially displaceable clamping means (35) comprises a sleeve member which exerts an inward radial force on said contact-making means (31) located within it and which co-operates with said contact-making means to provide ongoing pressure engagement of the contact-making means with the conductor when installed.

3. An electrical conductor terminating arrangement as claimed in claim 2, characterized in that the sleeve member (35) is resiliently compressible and is provided by a split ring.

4. An electrical conductor terminating arrangement as claimed in claim 2, characterized in that the sleeve member (35) comprises a continuous metal ring.

5. An electrical conductor terminating arrangement as claimed in any one of the preceding claims, characterized in that the contact-making means (31) comprises a collet adapted to fit over the conductor (44) and to be subjected to a radial compressive force by the clamping means (35) in order to cause the collet to clamp down on the conductor.

6. An electrical conductor terminating arrangement as claimed in claim 5, characterized in that the collet comprises a split tubular metal part which has a conductor-receiving end, with said tubular metal part adapted to be radially inwardly compressed to make good electrical contact with the conductor.

7. An electrical conductor terminating arrangement as claimed in claim 5, characterized in that said terminating arrangement includes a pin contact and in which the split tubular metal part (31) is formed integrally with said pin contact at an end of the split tubular metal part remote from the conductive compressible clamping means.

8. An electrical conductor terminating arrangement as claimed in claim 5, characterized in that said collet is configured to bite into the outer surface of the conductor as clamping takes place.

9. An electrical conductor terminating arrangement as claimed in claim 5, characterized in that the collet is provided with radial slots (34) which have a width less than the diameter of the conductor and which form tines with sharp edges (34*a*) to bite into the outer surface of the conductor to make good contact therewith when the clamping element is compressed.

10. An electrical conductor terminating arrangement as claimed in claim 9, characterized in that four slots (34) are provided in the collet.

11. An electrical conductor terminating arrangement as claimed in claim 7, characterized in that the clamping means comprises a sleeve member and the collet has a split frusto-conical section (33) that is engaged by said sleeve.

12. An electrical conductor terminating arrangement as claimed in claim 5, characterized in that the clamping means is stepped to accommodate conductors of different diameters.

13. A coaxial connector comprising a tubular body structure (23) having an axially extending bore therein for receiving an incoming coaxial cable that has a central cable conductor, including a conductor terminating arrangement comprising:

a collet with tines that can engage said central conductor and a sleeve member which is axially displaceable to compress said tines around said conductor to provide ongoing pressure engagement between said collet and the central conductor (44) of the coaxial cable.

14. A coaxial connector as claimed in claim 13, including:

an axially displaceable tubular insulating member (36) at least partly accommodated within said axially extending bore of the tubular body structure (23), and in which the sleeve member is axially movable by the tubular insulating member.

15. A coaxial connector as claimed in claim 14, including a cup-shaped stop member, and in which axial movement of the tubular insulating member (36) during clamping is arrested by the engagement thereof with said stop member (27), with said stop member accommodated in the bore (37) of the tubular body structure and into which the sleeve member fits during conductor clamping.

16. A coaxial connector as claimed in claim 14, characterized in that the tubular insulating member (36) and the bore of the tubular body structure are provided, one with at least one projection and the other with at least one groove, which co-operate to lock the tubular insulating member in position within the bore of the body structure as conductor clamping takes place.

17. A co-axial connector as claimed in claim 13, characterized in that the tubular body structure comprises two parts (22, 23) which are threadingly connected together.

18. A coaxial connector as claimed in claim 17, characterized in that at least one part of the connector is composed of transparent insulating material to allow the condition of the connector to be inspected following separation of the body structure parts (22, 23).

* * * * *